Figure 1:
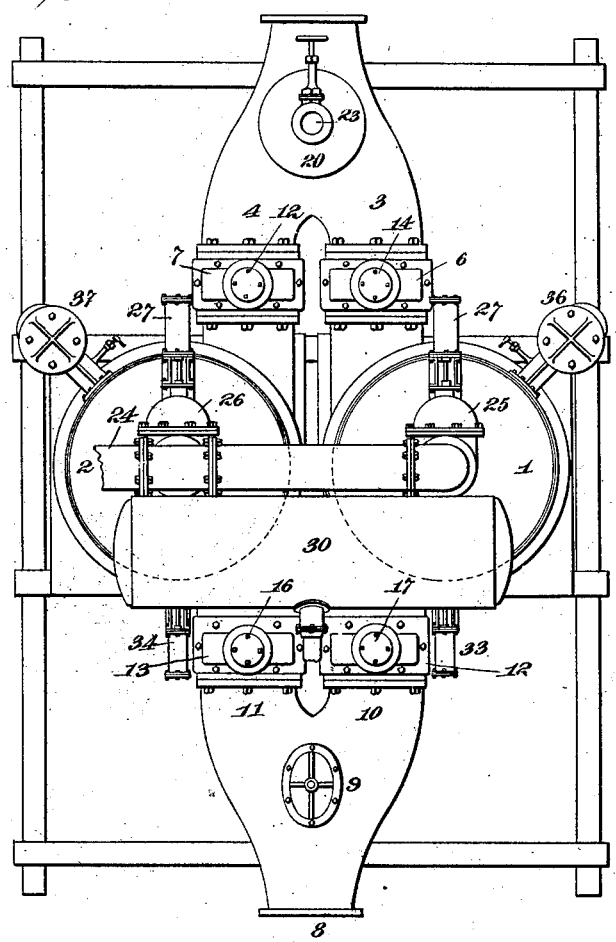

No. 676,168. Patented June 11, 1901.
H. R. WHEELER & G. J. MASHEK.
VACUUM PUMP.
(Application filed Dec. 7, 1900.)

(No Model.) 5 Sheets—Sheet 1.

Witnesses: Inventors

No. 676,168. Patented June 11, 1901.
H. R. WHEELER & G. J. MASHEK.
VACUUM PUMP.
(Application filed Dec. 7, 1900.)
(No Model.) 5 Sheets—Sheet 2.
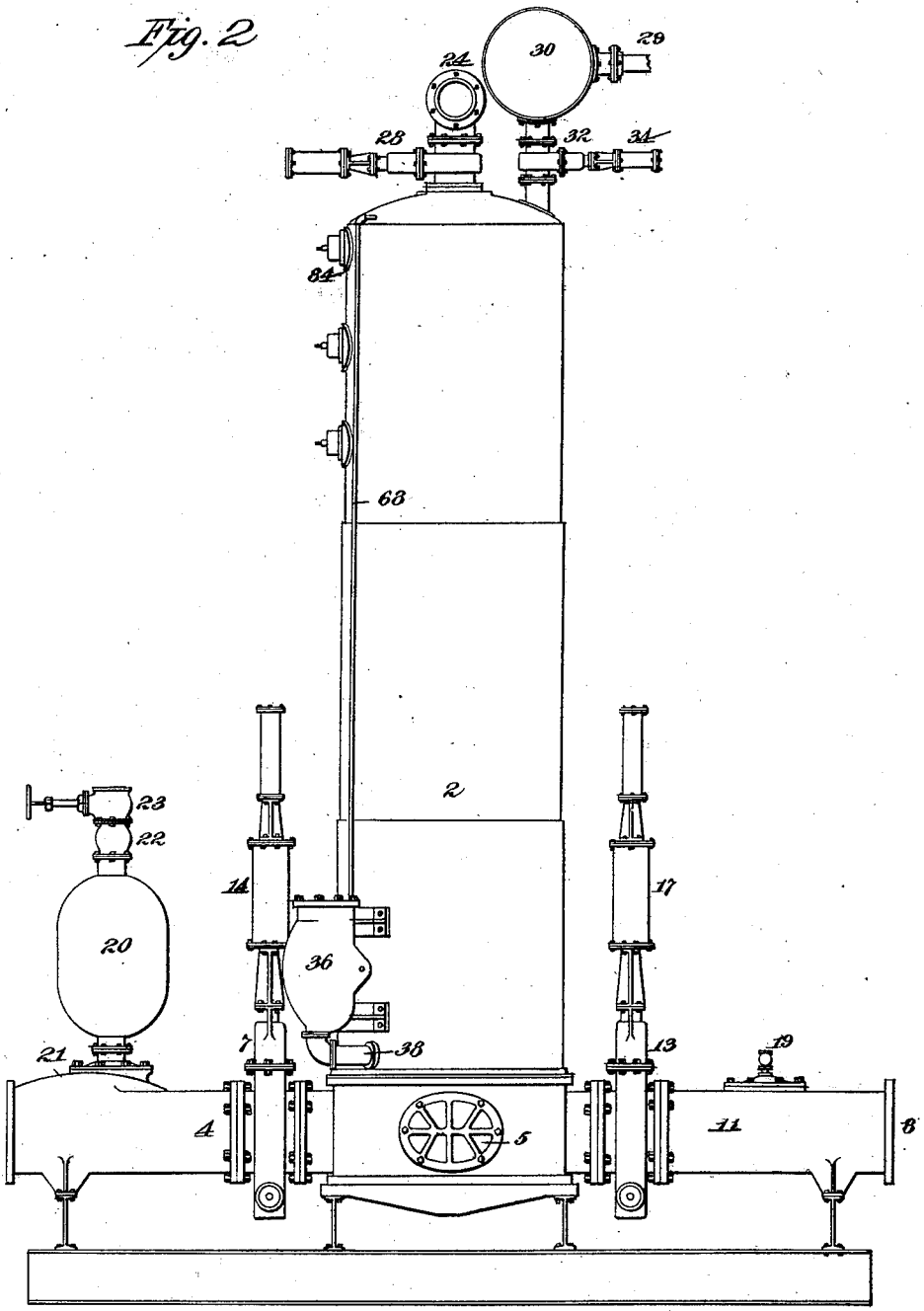
Witnesses: Inventors

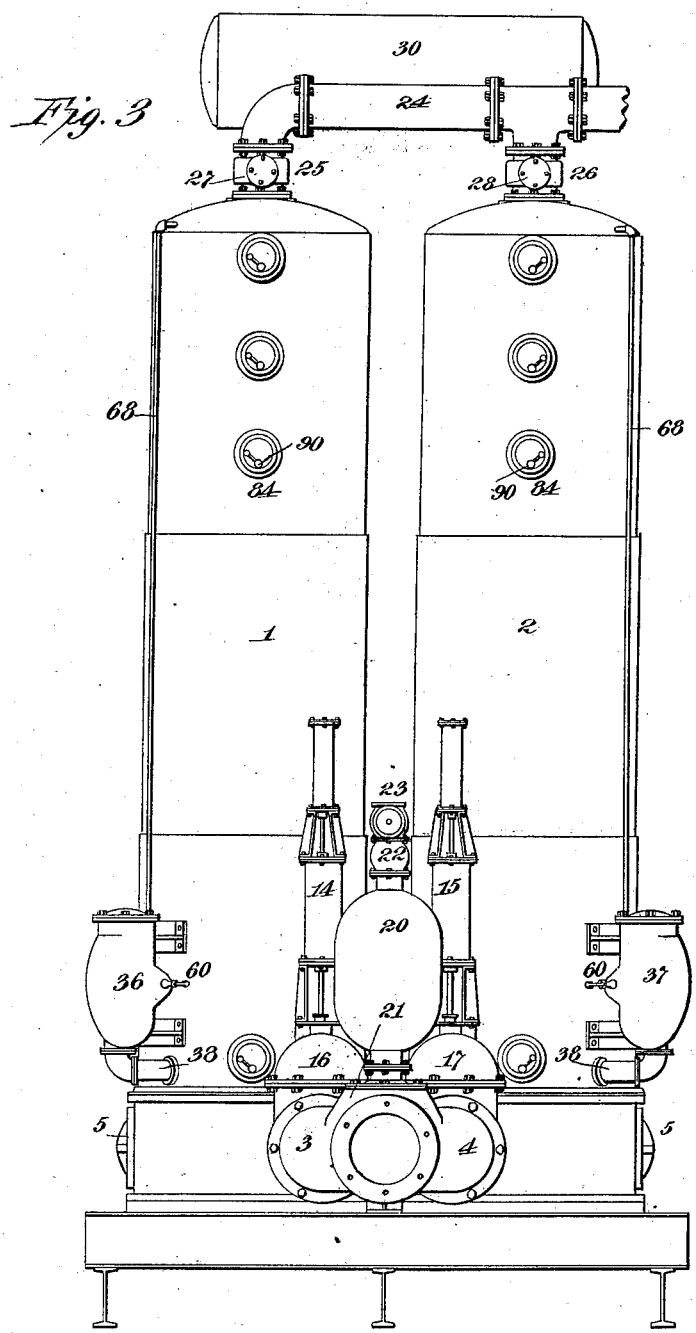

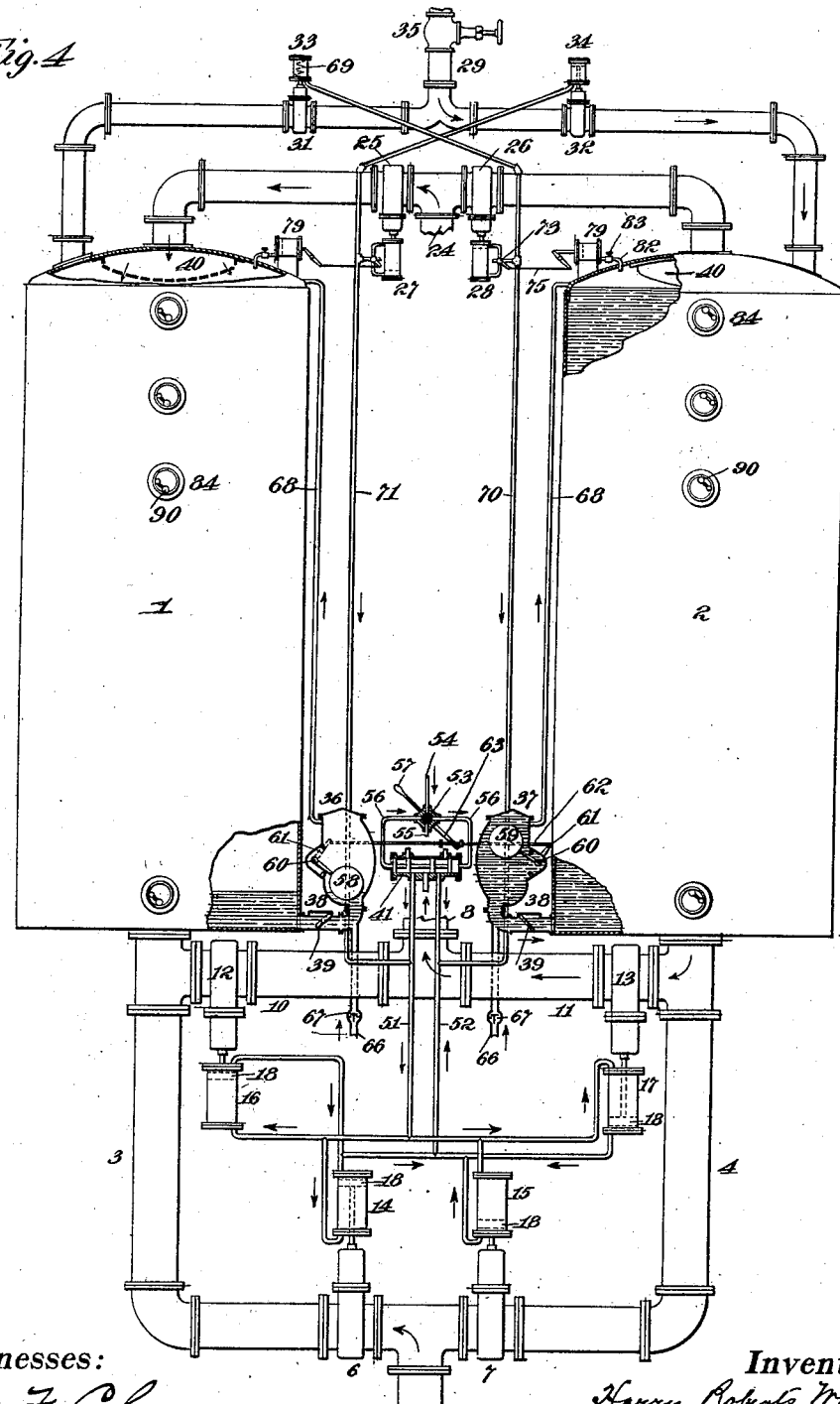

No. 676,168. Patented June 11, 1901.
H. R. WHEELER & G. J. MASHEK.
VACUUM PUMP.
(Application filed Dec. 7, 1900.)
(No Model.) 5 Sheets—Sheet 5.
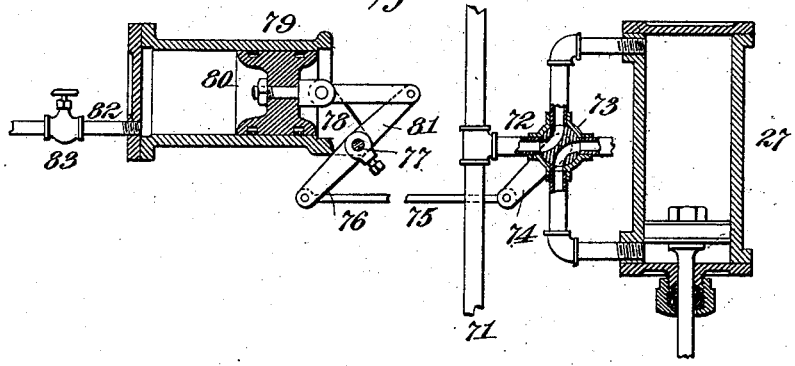
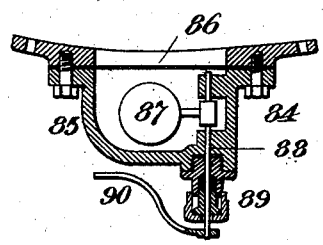
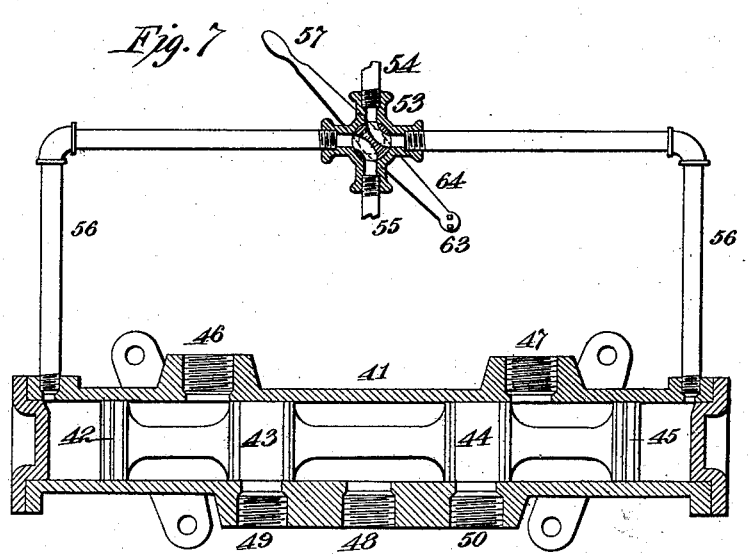
Witnesses: Inventors

UNITED STATES PATENT OFFICE.

HARRY R. WHEELER, OF BROOKLYN, NEW YORK, AND GEORGE J. MASHEK, OF NEWARK, NEW JERSEY; SAID MASHEK ASSIGNOR TO SAID WHEELER.

VACUUM-PUMP.

SPECIFICATION forming part of Letters Patent No. 676,168, dated June 11, 1901.

Application filed December 7, 1900. Serial No. 38,998. (No model.)

*To all whom it may concern:*

Be it known that we, HARRY ROBERTS WHEELER, residing in the borough of Brooklyn, city of New York, State of New York, and GEORGE J. MASHEK, residing at Newark, in the county of Essex and State of New Jersey, citizens of the United States, have invented a certain new and useful Improvement in Vacuum-Pumps, of which the following is a description.

Our invention relates to improvements in vacuum-pumps, and preferably to improvements in double vacuum-pumps for use in connection with dredging apparatus, as we describe and claim in our application for Letters Patent, filed May 14, 1900, Serial No. 16,585.

Our object is to simplify the construction, improve the efficiency, and increase the capacity of vacuum pumping apparatus employing one or more pumping-cylinders.

Our improved vacuum-pump when used with a plurality of cylinders is especially adapted for use in a dredging apparatus, since with our device the supply of condensing-water is cut off as soon as the desired vacuum is reached, whether the vacuum is created slowly or quickly, and with our device the steam-supply for forcing the material out of the vacuum-cylinders is cut off as soon as the complete discharge, or substantially so, of the material from a vacuum-cylinder is secured, followed immediately by the commencement of the discharge from the companion cylinder or from a succeeding cylinder when more than two are used, whereby the material in the discharge-pipe will be carried in constant and uniform movement, and hence may be moved with a minimum expenditure of power.

There are features of detail in our improved apparatus which are also new which increase the general efficiency of the device and which are not strictly limited for use in connection with a vacuum-pump for dredging purposes. For instance, the improvement already indicated of providing means for cutting off the supply of condensing-water when the desired vacuum is secured can be employed in any device wherein a vacuum is formed by the use of condensing-water and in which the economy indicated may be desired.

Another specific detail of improvement consists in a novel arrangement of float for actuating a controlling-valve when the level of the material in the cylinder has reached the point where the steam requires to be cut off and a new vacuum created. If it were attempted to employ a float which was directly immersed in the liquid acted on by the pump and in the supposed case carrying a large percentage of mud or other sediment, the parts of the float would be quickly incased in the deposit and would be prevented from acting properly. In our improvement we so construct and operate the float as to keep the latter always out of contact with the water carrying the sediment, whereby the objection indicated is overcome. This feature of our invention is not only applicable to vacuum-pumps suitable for dredging purposes, wherein it may be desirable to keep the float from contact with the water carrying a heavy sediment, but may be used in connection with a vacuum-pump for other purposes—as, for instance, with the pumping of acids—where it is desirable to operate the float without allowing the latter to be affected by the liquid upon which the pump is working. In the pumping of acids by means of a vacuum or compressed-air pump employing a float, the position of which cuts off the steam or air pressure, it will be obvious that the acid will quickly attack the packing of the parts operated by the float, thereby preventing the use of the latter; but with our improvement by maintaining the float out of contact with the material acted upon no such objection as this can occur.

In carrying out that specific feature of our invention by which we automatically cut off the condensing-water when the desired vacuum is reached we employ in connection with a vacuum-chamber a cylinder connected therewith and having a piston or diaphragm which is moved under the effect of the vacuum to cut off the water-supply either directly or through the intermediation of a pilot-valve of a pressure-cylinder the piston of which connects with the water-valve, the passage connecting the cylinder with the vacuum-chamber being preferably provided with a regulating-valve therein, by means of which a proper regulation of the movements of the piston in the controlling-cylinder will be secured.

In carrying into effect the specific feature of improvement by which we are enabled to control the steam cut-off and supply to a vacuum-pump by means of a float we employ in connection with a vacuum-chamber a float-chamber containing a fluid therein which operates a shaft extending through the wall of said float-chamber, the latter being connected to the vacuum-chamber at its bottom by a passage and at its top by an equalizing-pipe, and the float-chamber being connected to a clear-water supply by a pipe leading therein, suitable provision being made, as by a check-valve, to prevent flow of material from the vacuum-chamber into the float-chamber through the bottom connecting-passage between the two. By means of this construction the creation of a vacuum in the vacuum-chamber results in suction of the material to be pumped therein and in suction of clear water into the float-chamber, any excess being carried up through the counterbalancing-pipe to the equalizing-pipe and flowing into the vacuum-chamber, whereby the float will be immersed in clear water. Upon forcing all the material out of the vacuum-chamber the clear water from the float-chamber will assume the level of the liquid in the vacuum-chamber, flowing out of the float-chamber through the bottom passage and past the check or other form of valve therein, if used, and when the level of the clear water in the float-chamber has dropped sufficiently the float will be actuated to control the cut-off of the steam and the admission of condensing water.

In order that our invention may be better understood, attention is directed to the accompanying drawings, forming part of this specification, and in which—

Figure 8:
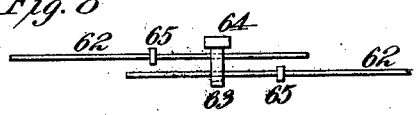

Figure 1 is a plan view of our improved vacuum-pump, showing the use of two cylinders therewith; Fig. 2, a side view of the same; Fig. 3, an end view; Fig. 4, a diagram of the vacuum-pump, illustrating the mode of operation thereof; Fig. 5, a detail view illustrating the parts comprising our improved device for cutting off the condensing-water automatically upon the creation of the desired vacuum in the vacuum-chamber; Fig. 6, a detail sectional view of the preferred construction of vacuum-indicators; Fig. 7, a detail view of the main controlling-valve for the several cylinders used in connection with the vacuum-pump; Fig. 8, a detail view showing the connection between the operating-lever for the pilot-valve of the main controlling-valve and the actuating-rods of the floats.

In all of the above views corresponding parts are represented by the same numerals of reference.

In the above drawings we illustrate a vacuum-pump comprising a pair of intermittently-operating vacuum-chambers 1 and 2; but obviously a greater number may be used. Leading into the bottom of each vacuum-chamber is a branch 3 4, which branches connect with a common suction-opening, as shown. At the bottom of each vacuum-chamber we preferably employ a manhole 5 to permit cleaning. A suitable valve 6 opens and closes the branch 3 to the vacuum-chamber 1, and a corresponding valve 7 controls the branch 4. Preferably these valves are gate-valves, which work more effectively in the pumping of water carrying large percentages of solid matter.

8 is the discharge or outlet, fed from two chambers, which connects with any suitable discharge-pipe 9 for conveying away the discharged matter. A branch 10 leads from the vacuum-chamber 1 to the discharge-opening 8, and a similar branch 11 connects the vacuum-chamber 2 with said discharge-opening. These branches 10 and 11 are controlled by valves, preferably gate-valves 12 and 13, respectively. The valves 6, 7, 12, and 13 are actuated by pressure-cylinders 14, 15, 16, and 17, respectively, (shown more particularly in the diagram Fig. 4,) the piston 18 of each of these cylinders being connected to the respective valve, whereby the movement of said piston with any cylinder will result in the opening or closing of the valve, as will be understood. The particular pipe connection and operation of these cylinders will be more fully described hereinafter in connection with the diagrammatic view in Fig. 4. Connected with the discharge of the pumps is a valve-pipe 19, which may be opened in starting to permit air to be blown out of the vacuum-chambers, the escape of steam through said pipe indicating when the air has been expelled. Connected to the suction end of the pumps is a gas-separating chamber 20, which preferably is seated upon the bulge or enlargement 21, said chamber being provided with a check-valve 22, opening outwardly, and with a globe-valve 23. When the apparatus is employed in connection with fluids or semifluids carrying air or gas therein, the globe-valve 23 is maintained open. At each suction movement of the stream, followed by a momentary arrest thereof, the liquid will be forced into the gas-separating chamber 20, as in the hydraulic ram, whereby any gas or air contained therein will be expelled through the check-valve 22, whereby we reduce the proportion of air or gas entering the vacuum-chambers and correspondingly increase the efficiency of the device. When the stream of material acted on does not carry away the gas with it, the globe-valve 23 will be kept closed. Extending above the vacuum-chambers is a water-pipe 24, supplied with water in any suitable way and having branches leading into the top of the vacuum-chambers, as shown, such branches being controlled by valves 25 and 26, preferably gate-valves, and which are actuated by pressure-cylinders 27 and 28, respectively. Steam is adapted to be intermittently admitted to the vacuum-chambers through the steam-pipe 29, which preferably connects with a steam-drum 30, from which lead pipes to the two vacuum-chambers, said pipes being provided with controlling-valves 31 and 32, the valve 31 being shown only in Fig. 4. These valves are also preferably gate-valves, which are controlled by pressure-cylinders 33 and 34, respectively. The steam-pipe 29 is provided with a controlling-valve 35, (see Fig. 4,) by which the quantity of steam admitted to the apparatus can be regulated. The steam-drum 30 can be dispensed with; but we prefer to use it, since the steam accumulated therein will permit of a more rapid steam-supply to the vacuum-chambers when either steam-valve 31 or 32 is opened than could otherwise be secured. Connected to the vacuum-chambers at their lower ends are the float-chambers 36 and 37, respectively, the pipes 38, which connect said float-chambers with the vacuum-chambers, being preferably provided each with a check-valve 39 therein for preventing the liquid from passing from the vacuum-chambers into the float-chamber, but admitting of flow in the other direction. The check-valves 39 when used are made as light and as easily movable as possible, so as to reduce to a minimum any obstruction of flow of liquid from the float-chambers into the respective vacuum-chambers. Instead of using a check-valve any mechanical equivalent can be adopted for the purpose.

Referring now particularly to Fig. 4, the pipe connections and operation of the parts will appear more clearly, the view being diagrammatic and not representing the elements in the same relation as we show in Figs. 1, 2, and 3. The water-supply entering past the valve 25 or 26, as the case may be, enters the vacuum-chamber at its top and is caused to pass through a perforated plate or rose 40, by which the water will be directed into the chamber in the form of a fine spray, so as to more effectively produce condensation of the steam. In order to control the admission of steam or other fluid pressure properly to the pressure-cylinders, we employ a main controlling-valve 41, which is more clearly shown in Fig. 7. Said controlling-valve comprises a cylinder carrying the connected pistons 42, 43, 44, and 45 therein. The space between the pistons 42 and 43 connects at all times with an exhaust-port 46, while the space between the pistons 44 and 45 connects at all times with an exhaust-port 47. The space between the pistons 43 and 44 connects at all times with a steam or other pressure inlet pipe 48. By moving the valve to the left in Fig. 7 the steam or other pressure will be admitted to a port 49, while by moving it to the right the pressure will be admitted to a port 50. Connected with the port 49 is a pipe 51, having branches leading to the back of the pressure-cylinders 15 and 16 and to the front of the pressure-cylinders 14 and 17. Connected with the port 50 is a pipe 52, having branches which lead to the back of the cylinders 14 and 17 and to the front of the cylinders 15 and 16. It will be seen that by shifting the valve to the left in Fig. 7 steam or other pressure will be allowed to actuate the cylinders 15 and 16 to close the valves 7 and 12 and to actuate the cylinders 14 and 17 to open the valves 6 and 13, this being the position of the parts shown in Fig. 4, permitting material to enter by suction the vacuum-chamber 1 and allowing material to be forced by pressure from the vacuum-chamber 2, the arrows indicating the flow of such material. Upon moving the valve to the other side the reverse operations take place, the closed valves being opened and the open valves being closed. We can operate the valve 41 in any suitable way; but for convenience we prefer to operate said valve by means of a small pilot-valve 53, as shown in Fig. 4, said valve being of the ordinary four-way type. A pressure-supply pipe 54 leads to the casing of the valve and an exhaust-pipe 55 leads from said casing. The ends of the cylinder of the valve 41 are connected with the pilot-valve casing by pipes 56, whereby by moving said pilot-valve in one direction fluid-pressure from the pressure-pipe will enter the casing of the valve 41 to engage the piston 42 or 45, while by moving the pilot-valve in the other direction the reverse operation will take place, as will be obvious. The pilot-valve 53 is provided with a handle 57, by which it may be operated by hand, if desired. We prefer to effect an automatic operation of the pilot-valve when the device is properly operating by means of floats carried in the float-chambers 36 and 37.

58 is the float mounted in the float-chamber 36, and 59 is the other float, both of said floats being carried on horizontal shafts 60, extending through the walls of the float-chambers and provided with arms 61 at their ends, to which are connected the actuating-rods 62. (Shown more clearly in Fig. 8.) Each of these actuating-rods passes through a fork 63, carried on a lever 64, which is secured to the pilot-valve 53, and each of the actuating-rods 62 is provided with a collar 65, which is adapted to engage the fork 63 to shift the position of the pilot-valve. It will be obvious that a movement of the actuating-rods 62 away from the fork 63 will not affect the pilot-valve, which will be actuated only by a reverse movement of either of said actuating-rods.

In order that the floats and float-chamber may not be brought in contact with the material operated upon, with the objections before indicated, we lead to each of the float-chambers a pipe 66, which connects with a clean-water supply. When our improved vacuum-pump is used on a dredging apparatus, the pipes 66 may extend a few feet below the surface of the water, so that clear water may be always drawn by suction up through the same. Each clear-water pipe is provided with a check-valve 67 to prevent backflow. In order to balance the pressure in the float-chambers, we connect each chamber at its top with the upper end of the corresponding vacuum-chamber by means of an equalizing-pipe 68, whereby the liquid in the float-chamber will be subjected to the same vacuum or pressure as its connected vacuum-chamber. It will be obvious that when a vacuum is created in either of the vacuum-chambers to draw material by suction therein clean water will be drawn by suction through the pipe 66 into the attached float-chamber, so that the float may be subjected only to such water, while when pressure is turned into the vacuum-chamber to eject water therefrom the level of the water in the float-chamber will correspond substantially to that of the material in the vacuum-chamber, such flow being permitted past the check-valve 39 and the pipe 38. Should the float-chamber fill with clear water before the vacuum-chamber fills with material, the overflow will pass through the equalizing-pipe 68 into the vacuum-chamber without harm, and such overflow, owing to the small bore of the equalizing-pipe, will be small.

In order to operate the steam-valves 31 and 32 for the two vacuum-chambers, we employ single-acting cylinders 33 and 34, as explained, each cylinder being provided with a spring 69 above its piston or otherwise connected thereto, so as to tend to normally close the steam-valves. Leading to the front end of the cylinder 33 is a pipe 70, which connects with the pipe 52. A corresponding pipe 71 connects the pressure-pipe 51 with the front end of the cylinder 34. A branch 72 leads from the pipe 71 to a four-way valve 73, which controls the pressure to the cylinder 27, said four-way valve being illustrated more particularly in Fig. 5, showing the valve in its normal position, in which it will be observed the fluid-pressure from the pipe 71 will be allowed to enter the front of the cylinder 27 to open the valve 25. An exactly similar arrangement of four-way valve is adopted in connection with the cylinder 28. The stem of each valve 73 is provided with a lever 74, which connects by a link 75 to an arm 76 on the shaft 77, carried by bracket-arms 78 from a small cylinder 79 for each vacuum-chamber, as shown particularly in Fig. 5. The cylinder 79 is employed for the purpose of cutting off the condensing-water when the desired vacuum has been secured. It carries a piston 80, which connects by an arm 81 to the shaft 77, and is connected at its end by a pipe 82, which opens into the respective vacuum-chambers. The pipe 82 is provided with a valve 83 therein, which may be adjusted to regulate the capacity of said pipe. In Fig. 5 we show the parts comprising this controlling device in their normal position—i. e., when there is no vacuum in the chamber. In Fig. 4 we show the controlling device for the vacuum-chamber 2 in its normal position and for the vacuum-chamber 1 in its abnormal position, the assumption being that in the latter chamber a vacuum has been created.

It is desirable to secure an indication of the approximate level of liquid or other material in either vacuum-chamber in order that any interruption in the correct operation can be detected, and, further, to allow the regulation of steam-pressure within the vacuum-chambers to be so effected as to provide for the proper discharge of the material therefrom. An ordinary gage would be undesirable in connection with fluids carrying a large percentage of solid matter, as they would be quickly incased with sediment, so as to become opaque. We therefore prefer to use a series of indicators 84, connected with each vacuum-chamber and extending in preferably a vertical line on the front wall thereof. Each of these gages comprises a bonnet or casing 85, secured to the vacuum-chamber, a screen 86 being clamped between the bonnet and chamber, as shown in Fig. 6, to prevent the entrance of solid matter or of an objectionable amount of solid matter into said bonnet. Within each bonnet or casing is a float 87, carried on a shaft 88, extending through a suitable packing 89 and carrying at its end, outside of the bonnet, a pointer or finger 90. It is obvious that when the level of liquid material in the vacuum-chamber is higher than one of the floats 87 the latter will be elevated to elevate the pointer or finger 90 thereof, while if the level of the liquid in the vacuum-chamber is below that of any of the floats the corresponding finger or pointer will be correspondingly depressed to thereby give an approximate indication of the height of the material in the chamber.

The operation of our improved pumping apparatus is as follows: At each suction operation of the alternately-operating pumps the material flowing through the suction-pipe and in through the suction-opening of the pumps will be momentarily brought to rest, as explained, and freed from air or gas by means of the gas-separating chamber 20. Assuming the parts to be in the position shown in Fig. 4, it is to be supposed that a vacuum has been created in the vacuum-chamber 1 by condensing-water passing through the valve 25 and injected as a spray in said cylinder, such vacuum permitting the piston 80 of the attached cylinder 79 to be moved by atmospheric pressure rearwardly, shifting the position of the four-way valve 73 and permitting the fluid-pressure in the pipe 71 to close the valve 25. The assumption also is that the vacuum-chamber 2 is fully charged with material, the steam is entering said chamber to force the material therefrom, the suction-valve 6 for the chamber 1 is open, its discharge-valve 12 is closed, the suction-valve 7 for the chamber 2 is closed, and its discharge-valve 13 is open. The valve 41 and pilot-valve 53 are in the positions indicated, and steam or other fluid is exerting pressure in the directions indicated by the arrows upon the several pipes. The creation of the vacuum in the chamber 1 causes the material from the suction-pipe to be drawn into said chamber. The vacuum will also exist in the float-chamber 36, which will be filled with clear water through the clear-water pipe 66, any overflow of clear water passing through the equalizing or counterbalancing pipe 68 into the vacuum-chamber. The admission of clear water into the float-chamber 36 elevates the float 58 and withdraws the collar 65 on the corresponding actuating-rod 62 from the fork 63, so as not to affect the position of the pilot-valve. Steam being admitted into the vacuum-chamber 2 past the valve 32 will force the material out of said chamber past the valve 13 and out through the discharge-pipe. The steam-pressure within the vacuum-chamber 2 will be equalized through the counterbalancing-pipe 68 upon the clear water in the float-chamber 37. As the level of the liquid material in the vacuum-chamber falls the level of the clear water in the counterbalancing-pipe 68 or in the float-chamber 37 will correspond substantially therewith, any difference in such levels being due to the slight resistance of the check-valve 39. When the level of the liquid material in the vacuum-chamber 2 has fallen sufficiently to permit a flow of clear water from the float-chamber 37 into such vacuum-chamber past the valve 39, the float 59 will descend and the collar 65 on the actuating-rod 62 thereof will engage the fork 63 to shift the position of the pilot-valve 53. When the pilot-valve is thus shifted, the valve 41 will be reversed and pressure will be admitted to the pipe 52, while the pipe 51 will be connected with the exhaust. The pressure from the pipe 52 will close the suction-valve 6 and open the discharge-valve 12 of the vacuum-chamber 1, which will be filled with material, and will open the suction-valve 7 and close the discharge-valve 13 of the vacuum-chamber 2, which will be filled with steam. Pressure from the pipe 52 through the branch 70 opens the steam-valve 31 of the vacuum-chamber 1 and opens the water-valve 26 of vacuum-chamber 2. As soon as the pressure is withdrawn from the pipes 51 and 71, the steam-valve 32 for the vacuum-chamber 2 closes. The injection of condensing-water in the chamber 2 results in the creation of a vacuum therein until said vacuum is sufficient to actuate the controlling-cylinder 79 therefor to move the four-way valve 73 to permit pressure from the pipe 70 to close the valve 26. Such vacuum also draws a charge of material into the vacuum-chamber 2 and a supply of clear water into the float-chamber 37, as explained. In the operation of a pair of vacuum-pumps it is desirable to so regulate the suction and discharge that both will be approximately constant, this being effected with our apparatus by regulating the steam-valve 35, by which the flow of material from either vacuum-chamber may be made to substantially correspond to the suction of material therein, the outward and inward flows being indicated by the pointers or fingers 90, as explained. It is, however, ordinarily not strictly necessary to secure a continuous flow of material from the suction-pipe into the vacuum-chambers, and particularly when the pumps are used in connection with a dredge, since the bulk of material in motion between the suction-pipe of the dredge and the pump is not very great, and, in fact, a retardation thereof may sometimes be desirable when the separation of the air or gas therefrom is to be secured, as explained. It is, however, strictly necessary in the operation of the vacuum-pumps in tandem or in alternation, when the discharge-pipe is of considerable length, to secure a constant, uninterrupted, and continuous flow of material through the same. If the material within a long discharge-pipe were allowed to come to rest and were required to be again set in motion at each pulsation of the pumps, there would be an enormous waste of energy, and there would be no comparison in efficiency between such a device and a centrifugal pump, however objectionable the latter may be in theory. With our improved device the introduction of steam into one vacuum-chamber is effected by the lowering of the liquid in the other, and there is a period of time in the operation when steam under pressure is forcing material simultaneously from both of the vacuum-chambers—that is to say, when the discharge-valve 12 for the chamber 1 is closing the corresponding valve 13 for the chamber 2 is opening. Since these two valves operate in substantial unison, one being closed while the other is open, the area of the discharge from the two chambers remains approximately the same, so that the volume of the stream is maintained uniform and continuous at all times.

Having now described our invention, what we claim as new, and desire to secure by Letters Patent, is as follows:

1. In a pumping apparatus, the combination of a pump having an intermittent suction, a suction-pipe with which said pump connects, an air or gas discharge passage connected to the suction-pipe, and a check-valve in said passage, substantially as set forth.

2. In a pumping apparatus, the combination of a sucking device having an intermittent suction, a suction-pipe with which said device connects, an air or gas separating chamber connected to said suction-pipe, a discharge from said chamber, and a check-valve in said discharge, substantially as set forth.

3. In a pumping apparatus, the combination of a sucking device having an intermittent suction, a suction-pipe with which said device connects, an air or gas separating chamber connected to said suction-pipe, a discharge from said chamber, a check-valve in said discharge, and a cut-off valve also in said discharge, substantially as set forth.

4. In a pumping apparatus, the combination of a vacuum-pump, a suction-pipe with which said pump having an intermittent suction connects, a vertical enlargement in said pipe, an air or gas separating chamber connected with said vertical enlargement, a discharge from said chamber, and a check-valve in said discharge, substantially as set forth.

5. The combination with a suction-pipe, of two or more vacuum-chambers connected therewith, a discharge from said chambers, valves controlling the admission and discharge of material to and from each of said chambers, and means exterior of the chambers and controlled by the level of the material in one chamber for cutting off the discharge therefrom and effecting the discharge from the other, substantially as set forth.

6. The combination with a suction-pipe, of two or more vacuum-chambers connected therewith, a discharge from said chambers, valves controlling the admission and discharge of material to and from each of said chambers, a float-chamber connected to each chamber, a float for each float-chamber, the position of which float is determined by the level of the material in its respective chamber, and means operated by the float of one float-chamber for effecting the discharge from another chamber, substantially as set forth.

7. The combination with a suction-pipe, of a plurality of vacuum-chambers connected therewith, a discharge from said chambers, valves controlling the admission to and discharge of material from said chambers, pressure-cylinders for actuating said valves, a controlling-valve for said pressure-cylinders, a float-chamber connected to each vacuum-chamber, a float for each float-chamber, the position of which is determined by the level of said material in its respective chamber, and connections between said floats and the controlling-valve, substantially as set forth.

8. The combination with a suction-pipe, of a plurality of vacuum-chambers connected therewith, a discharge from said chambers, valves controlling the admission to and discharge of material from said chambers, pressure-cylinders for actuating said valves, a controlling-valve for said pressure-cylinders, a float for each vacuum-chamber, the position of which is determined by the level of said material in its respective chamber, a pilot-valve for operating the controlling-valve, and connections between the pilot-valve and said floats, substantially as set forth.

9. The combination with a suction-pipe, of a vacuum-chamber, a float-chamber connected therewith, a float in the float-chamber, and a clear-water pipe leading to the float-chamber, substantially as set forth.

10. The combination with a suction-pipe, of a vacuum-chamber, a float-chamber connected therewith, a float in the float-chamber, a clear-water pipe leading to the float-chamber, and a counterbalancing-pipe connecting the top of the float-chamber with the upper end of the vacuum-chamber, substantially as set forth.

11. The combination with a suction-pipe, of a vacuum-chamber, a float-chamber connected therewith at the lower end, a check-valve in such connection, a counterbalancing-pipe connecting the upper end of the float-chamber with the upper end of the vacuum-chamber, and a clear-water pipe leading into the float-chamber, substantially as set forth.

12. The combination with a suction-pipe, of a vacuum-chamber, a float-chamber connected therewith at the lower end, a check-valve in such connection, a counterbalancing-pipe connecting the upper end of the float-chamber with the upper end of the vacuum-chamber, a clear-water pipe leading into the float-chamber, and a check-valve in said clear-water pipe, substantially as set forth.

13. The combination with a suction-pipe, of a vacuum-chamber of a vacuum-pump, a pipe supplying condensing-water thereto, a valve in said pipe, a vacuum-cylinder connected with the vacuum-chamber, a device movable in the vacuum-cylinder, and means operated by said device for closing said valve when a vacuum is created in the vacuum-chamber, substantially as set forth.

14. The combination with a suction-pipe, of a vacuum-chamber of a vacuum-pump, a pipe supplying condensing-water thereto, a valve in said pipe, a vacuum-cylinder connected with the vacuum-chamber, a device movable in the vacuum-cylinder, means operated by said device for closing said valve when a vacuum is created in the vacuum-chamber, and a regulating-valve between the vacuum-chamber and vacuum-cylinder, substantially as set forth.

15. The combination with a suction-pipe, of a vacuum-chamber of a vacuum-pump, a condensing-water-supply pipe therefor, a valve in said pipe, a pressure-cylinder for actuating said valve, a controlling-valve for said pressure-cylinder, a vacuum-cylinder connected with the vacuum-chamber, a device movable in said vacuum-cylinder, and connections between said device and the controlling-valve of the pressure-cylinder, substantially as set forth.

16. The combination with a plurality of vacuum-chambers, of a main steam-supply pipe, a steam-drum connected therewith, branch pipes leading from said drum into the respective chambers, a valve in each branch pipe, pressure-cylinders for operating said valves, and floats controlling said pressure-cylinders and actuated by a drop in the level of material in the several vacuum-chambers, substantially as set forth.

This specification signed and witnessed this 21st day of November, 1900.

HARRY R. WHEELER.
GEORGE J. MASHEK.

Witnesses:
FRANK L. DYER,
S. O. EDMONDS.